United States Patent Office 3,065,059
Patented Nov. 20, 1962

3,065,059
PRODUCTION OF SULFUR
Otto Redlich, Berkeley, and Michael N. Papadopoulos, Walnut Creek, Calif., assignors to Shell Oil Company, New York, N.Y., a corporation of Delaware
No Drawing. Filed July 28, 1961, Ser. No. 127,515
2 Claims. (Cl. 23—225)

This invention relates to a process for the production of sulfur and more particularly to a process for producing sulfur from hydrogen sulfide.

Gases from refinery streams often contain hydrogen sulfide. This material is present in many crude oils and is also formed by the decomposition of other sulfur compounds in crude oils during the refining processes. Natural gases produced in some areas also contain substantial amounts of hydrogen sulfide. The hydrogen sulfide is a most undesirable contaminant because of very high toxicity, unpleasant odor, damage to vegetation, and also as it can cause severe corrosion of equipment under certain conditions. It is, accordingly, a practice to remove the hydrogen sulfide from such gas streams to the extent practical and to convert the hydrogen sulfide into sulfur. One means has been to separate the hydrogen sulfide from the gas stream by an absorber employing basic solutions in countercurrent contact with the hydrogen sulfide containing gas. The absorbing liquid is subsequently stripped with steam. The hydrogen sulfide is then converted to sulfur by the modified Claus process in which oxidation of the hydrogen sulfide to water and elemental sulfur takes place. However, a total conversion of the hydrogen sulfide and sulfur dioxide is impossible. As a result, the effluent gases from modified Claus process furnaces contain hydrogen sulfide and sulfur dioxide in small concentrations.

The present commercial exploitation of the sour natural gas with the necessary removal of the high percentage of hydrogen sulfide therefrom to meet pipeline shipment specifications has required the erection of large plants, including the above processing steps, for removal of the hydrogen sulfide and its conversion to sulfur. With the very large increase in the amount of sulfur being recovered from gases, the total amount of hydrogen sulfide remaining in the effluent gases has increased so that the removal thereof is both necessary to reduce air pollution and desirable to recover the sulfur content of such waste gas.

It has been proposed to oxidize the hydrogen sulfide present in low concentration in a gaseous stream by passing the stream, mixed with an oxygen containing gas, through an aqueous solution of ferrous sulfate. For this purpose a solution of 10% ferrous sulfate with a pH of 3.5 has been used with some success. The ferrous sulfate is, however, slowly converted by oxidation and hydrolysis to basic ferric sulfate which co-precipitates with sulfur. The gradual lessening in activity of the solution limits the efficiency of the process. Alternatively, basic material must be added to maintain the pH within desired limits.

It is therefore an object of this invention to devise an improved process for the removal of residual amounts of hydrogen sulfide from gas streams.

It is a further object of this invention to obtain elemental sulfur from gases containing small amounts of hydrogen sulfide.

It is a further object of this invention to produce an improved catalyst for the oxidation of hydrogen sulfide to sulfur. The further objects and advantages of the invention will be seen from the following detailed description.

According to this invention gas containing hydrogen sulfide is passed with an oxygen containing gas through an aqueous solution of ferrous sulfate and ferrous perchlorate. By the partial replacement of sulfate ion by perchlorate ion the absorption efficiency is greatly improved and now the ferric ion is not hydrolyzed and precipitated.

We have found in particular that additions of small amounts of perchlorate ion to the ferrous sulfate solution greatly improve the efficiency of the process over that using ferrous sulfate alone. For instance, we have found that with as small an amount as 1% perchlorate added, the conversion to sulfur remained constant over a period of over 350 hours. Furthermore, the sulfur produced was bright yellow and not contaminated with a co-precipitate of basic ferric sulfate or ferric hydroxide.

The invention is further illustrated by the following example:

Example 1

Nitrogen gas containing 1% m $H_2S$ was bubbled through 120 ml. of aqueous solution containing 9% w. (0.32 M) $FeSO_4$ and 1% w. (0.04 M) $Fe(ClO_4)_2$ in three reaction vessels in series and maintained at a temperature of from 83–85° C. The gas was fed at a rate of 32 ml./min. and air at a rate of 13 ml./min. giving an air/feed gas ratio of 0.41. The test run was continued for 354 hours. While the percentage of $H_2S$ removed was about 70% at the start, the percentage removal towards the end of the run was about 80%. The pH of the solution was about 2 at the start and became about 1 after about 18 hours operation, remaining constant at about 1 thereafter.

While we do not in any way intend to limit our invention by a theory thereof, we believe that the rate of the overall reaction is determined by the oxidation of ferrous ion by dissolved oxygen. This leads to a very low concentration of iron in the tervalent state. The tervalent iron is rapidly reduced to bivalent iron by dissolved hydrogen sulfide, elemental sulfur being formed. With increasing $O_2/S$ ratio in the feed, however, an increasing fraction of the tervalent ion hydrolyzes and finally forms insoluble basic salt or ferric hydroxide. Although the specific rate of the hydrolysis is small compared with the specific rate of the reduction, significant amounts of basic precipitate are formed at low $H_2S$ concentration. This undesirable side reaction leads to depletion of the catalytic solution, decrease in pH and in absorption efficiency. By the presence of perchlorate ion hydrolysis and formation of insoluble basic ferric precipitate are avoided.

We claim as our invention:

1. A process for the production of sulfur comprising: passing a gas stream containing hydrogen sulfide together with an oxygen-containing gas through an aqueous solution of co-mixed ferrous sulfate and ferrous perchlorate and thereafter separating the sulfur precipitate from said solution.

2. A process as in claim 1 in which the ferrous perchlorate in the aqueous solution is in excess of about 1% by weight.

References Cited in the file of this patent
UNITED STATES PATENTS 737,579    Burschell _____ Sept. 1, 1903
1,516,915  De Loisy _____ Nov. 25, 1924